United States Patent
Payne et al.

[15] 3,707,218
[45] Dec. 26, 1972

[54] CONVEYOR APPARATUS
[72] Inventors: Mackey M. Payne, 7300 W. Radcliff, Littleton, Colo. 80120; John S. Harper, Jr., 2853 S. Krameria, Denver, Colo. 80222
[22] Filed: Oct. 26, 1970
[21] Appl. No.: 83,697

[52] U.S. Cl.................................................198/109
[51] Int. Cl..............................................B65g 41/00
[58] Field of Search...........................198/109, 204

[56] References Cited
UNITED STATES PATENTS 2,850,147  9/1958  Hill......................................198/109
2,795,315  6/1957  Hahir et al............................198/109
3,169,631  2/1965  Knappe.................................198/187

Primary Examiner—Evon C. Blunk
Assistant Examiner—Douglas D. Watts
Attorney—Sheridan, Ross & Burton

[57] ABSTRACT

An endless belt conveyor section for use with an endless belt of a type constructed to permit it to move in a curved path, characterized by guideways having articulated sections along which spaced belt carriers move along upper and lower runs, the articulated sections being adjustable to provide various curved paths of movement for the belt.

11 Claims, 4 Drawing Figures

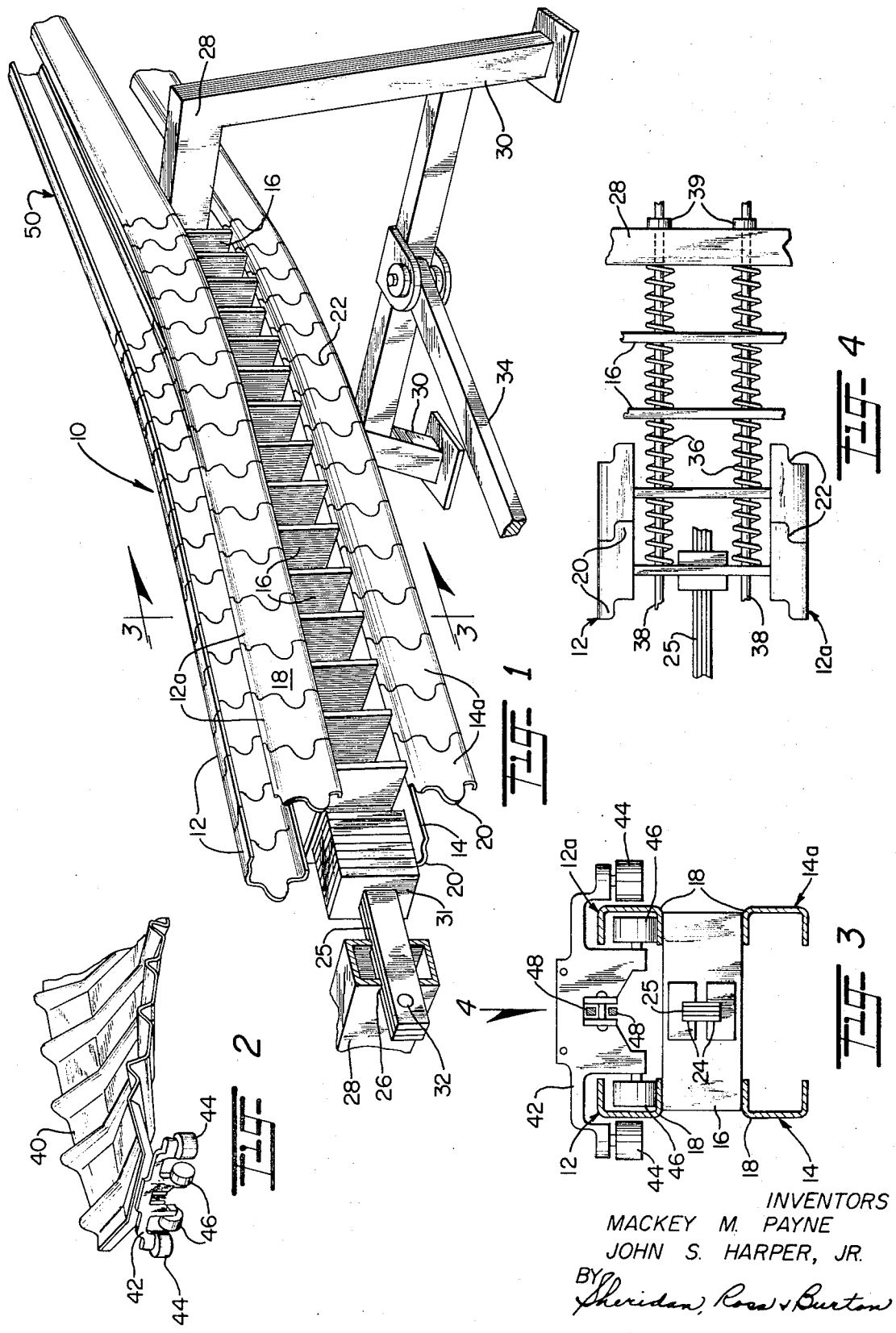

3,707,218

CONVEYOR APPARATUS

BACKGROUND OF THE INVENTION

Conveyors of the endless belt type have long been in use and comprise, in general, a suitable frame for supporting upper and lower runs of a belt and a powered drive for moving the belt. In the most simplified form the belt is flat and trained about rolls at the ends of the conveyor. The upper run, which carries the conveyed articles, is usually supported by either a flat surface on which it slides or on idler rolls. The lower run may or may not be similarly supported, depending on the length of the belt run or span, the weight of the lower run, and other criteria of design. A refinement of the basic conveyor referred to comprises a frame which guides a belt, usually constructed of articulated sections, in such manner that it may move in a curved path. The curved path may be in the vertical plane, the horizontal plane, about the axis of the direction of the run, or any combination of such directions. An example, where all directions are employed, is a conveyor having horizontal runs, inclined flat runs, spiral runs, and runs which twist the belt about its direction of movement, such as at a dumping station, and various transition runs therebetween.

An example of a conveyor, as just described, has been manufactured for some time by the Firma Albert Stübbe, 4973 Vlotho (Weser), P. O. Box 110, Germany, various features of which are disclosed in several patents to Horth and assigned to Friedrich Stübbe, Vlotho (Weser), Germany. U. S. Pat. No. 3,169,631 to Knappe discloses a belt having sections joined by flexible accordian-like joints which permit the belt to universally flex in all directions so that it may follow the exemplary curved path previously set forth. It is supported by spaced members having suitable rollers which roll along pairs of upper and lower channel shaped guideways, such members being interconnected by an endless driving chain.

While the construction just referred to may be designed to move a belt in any desired direction, it lacks some flexibility of use in that it cannot readily be changed to other curved paths without substitution of specifically designed sections.

SUMMARY OF THE INVENTION

The present invention employs the flexible belt disclosed in U. S. Pat. No. 3,169,631, together with the spaced belt supporting carriers, the rollers of which move along channel shaped guideways, the principal difference being in the construction of the guideway assembly. Briefly, the guideways are formed of articulated sections, the sections being secured together by a resilient rod which may be bent or twisted to a desired curve. The rod is secured at its ends to supports, such as legs, which may be oriented on a floor or the like, the specific orientation thereof effecting the desired flexure and/or torsion in the rod which, in turn, orients the articulated sections. The construction is thus analogous to the vertebrae of a spinal column.

The principal object of the invention is, accordingly, to provide an endless belt conveyor section which may be shaped to desired curvature between its ends, the curvature being changeable, as desired, to adapt it for use in various overall conveyor configurations.

Further objects, advantages, and salient features will become more apparent from the description to follow, the appended claims, and the accompanying drawing to now be briefly described.

BRIEF DESCRIPTION OF THE DRAWING

FIG. 1 is a perspective of the subject of the invention, certain portions being broken away and others omitted at the left side of the figure.

FIG. 2 is a perspective of a portion of an endless flexible belt adapted to move along the construction illustrated in FIG. 1;

FIG. 3 is a section taken on line 3—3, FIG. 1; and

FIG. 4 is a top elevation as viewed in the direction of arrow 4, FIG. 3, also illustrating a modification.

Referring now to the drawing, and first to FIG. 1, conveyor unit 10 comprises a pair of upper guideways 12,12a and a like pair of lower guideways 14,14a, these being formed in sections which are longitudinally aligned and interconnected for relative articulation. Each section comprises a rectangular plate 16 to which is rigidly affixed, such as by welding, four short channel members 18 disposed in quadrature, as best shown in FIG. 3. All sections are identical and the top, bottom and side walls of each are provided with mating tongues 20 and recesses 22 which interlock but permit relative articulation between the sections.

Each plate 16 is provided with a non-circular aperture 24. An elongated resilient rod 25 of like cross-section extends through all of the apertures 24 and its opposite ends extend through like apertures 26, one of which is shown, in longitudinally spaced supports 28, supports 28 being secured to legs 30 which may be oriented to desired positions on a floor or the like. Resilient blocks 31, such as rubber, are disposed between the plates 16 and supports 28 which may be compressed to varying degree at their various cross sections.

Each end of rod 25 is provided with an aperture 32 through which a pin (not shown) extends for securing the rod to the spaced supports in desired spaced relationship and with a desired degree of compression of the spacer blocks 31. An adjustable length tie rod 34 preferably extends between the legs.

As will be apparent from the construction so far described, legs 30, at opposite ends of the unit 10, may be disposed in various relative positions which stress rod 25 between its ends into a curve. Since blocks 31 are resilient and may compress to varying degree, the interlocking joints between the sections may remain in abutting relationship at some portions of conveyor unit 10 and may spread apart at other portions.

The cross sectional shape of rod 25 and its orientation in the various apertures may be varied according to the particular curvature desired in conveyor unit 10. As illustrated, rod 25 is formed of a plurality of rectangular spring steel members with their longer transverse dimension disposed in the vertical plane. If the curve in the conveyor unit is to be principally in the horizontal plane, this construction will generally be preferred. If, however, the curve is to be principally in the vertical plane, then the rod may be disposed 90° to the position shown. In either position, the rod has the same torsional resistance between its ends and a twist in the conveyor unit 10 may also be effected. In another form (not shown) the rod may be circular and keyed or splined within the various apertures through which it extends. With this construction, the rod has equal resistance to bending moment in all angular directions of its cross section.

FIG. 4 illustrates an alternative form of the invention in which compression springs 36 are employed between the sections in lieu of the resilient blocks previously described. The springs are formed as sets at each side of rod 25 and tie rods 38 extend through all springs and through supports 28, their ends being provided with threaded nuts 39. As will be apparent, by suitable adjustment of the lengths of tie rods 38 one set of springs may be compressed to a greater extent than the other to facilitate articulation of conveyor unit 10.

An exemplary belt 40, supported by spaced carriers 42 having idler rolls 44, 46 thereon is disclosed in FIG. 2. The relationship of the carriers to the guideways is illustrated in FIG. 3, their lower run being omitted in the interests of simplification of the drawing. As in the prior art, the carriers are secured to links of an endless chain 48 which transports the carriers around sheaves at the ends of the entire conveyor system, suitably driven as understood in the art.

As will be understood, the conveyor unit described will normally be employed as a section of an entire conveyor system or a number of such units may be employed at various positions along the entire system. As illustrated, for example, it is disposed adjacent a non-adjustable unit 50 which may either be straight or preformed to a desired curvature. Preformed curved units which are of utility for only a specific installation may thus be replaced by a unit as described herein, obviating specialized bending of structural members to desired curvatures and also permitting the unit to be employed when the curvature of a system must be changed to conform to a new conveying path.

What is claimed is:

1. An endless belt conveyor comprising:
   a. an endless belt of a type constructed to permit it to move along a curved path, including a plurality of longitudinally spaced belt carriers, each having laterally spaced supporting and guiding rollers thereon,
   b. a pair of laterally spaced elongated guideways along which the carriers are adapted to move,
   c. said guideways comprising a plurality of aligned sections,
   d. each section comprising a pair of laterally spaced relatively short, like-run portions, and rigid means extending therebetween securing same together against relative movement,
   e. each run portion having a substantially horizontal wall along which a roller rolls for supporting the belt and a substantially vertical wall along which a guide roller rolls for maintaining the belt laterally aligned with the guideways,
   f. a rigid fixed support disposed at each of the opposite ends of the guideways,
   g. a resilient rod extending between the rigid supports and through all of said rigid means substantially along said central line,
   h. opposite ends of said horizontal and vertical walls having mating adjacent interlocking tongues and recesses so constructed that when the rod is bent, the interlocking tongues and recesses remain in abutting relation along one guideway and spread apart along the other, thereby providing a greater length of curvature along the latter than the former,
   i. the connections between the resilient rod and rigid supports, and with said rigid means, being such that when said supports are oriented relatively to desired fixed positions, the rod is flexed to a curved configuration, which in turn, moves said sections to curved configurations conforming to the curvature of the rod.

2. A conveyor in accordance with claim 1 wherein each run portion is formed with a second horizontal wall spaced from the first named wall, forming three walls of a channel, and like tongues and recesses in said second horizontal wall.

3. A conveyor in accordance with claim 2 including a second like pair of lower return guideways affixed to said rigid means.

4. A conveyor in accordance with claim 2 wherein the open sides of the channels face each other and the guide rollers roll along opposite outside vertical walls of the channels.

5. A conveyor in accordance with claim 1 wherein said rod provides the sole support for the conveyor portion disposed between said rigid supports.

6. A conveyor in accordance with claim 1 wherein said rod is non-circular in cross section and so proportioned to provide greater resistance to bending moment in one direction than in a direction perpendicular thereto.

7. A conveyor in accordance with claim 6, wherein said rod comprises a plurality of adjacent like rectangular rods adapted to slip relatively, when flexed, thereby providing the beam strength of a solid rod of equal cross-section but with a lesser resistance to flexure thereof.

8. A conveyor in accordance with claim 6 wherein the rod is circular, having the same resistance against bending in all lateral directions.

9. A conveyor in accordance with claim 1 including resilient compression means disposed between said sections tending to urge same apart, the construction being such that when the rod is bent, the interlocking tongues and recesses remain in abutting relation along one guideway and spread apart along the other, thereby providing a greater length of curvature along the latter than the former.

10. An endless belt conveyor for use with a belt of a type constructed to permit it to move in a curved path, comprising:
   a. a pair of like laterally spaced elongated guideways along which a plurality of spaced belt carrier members are adapted to move,
   b. a support, such as a leg, disposed adjacent each of the opposite ends of the guideways,
   c. a resilient rod extending between the supports,
   d. said guideways being formed as articulated run portions affixed to the rod,
   e. the articulated run portions being formed of identical units, each unit comprising four spaced channel shaped members, the walls of which are provided with tongues and recesses adapted to mate and interlock with corresponding tongues and recesses of an adjacent unit, f. each unit being rigidly affixed adjacent corners of a rectangular plate, said plate having a central aperture through which the rod slideably extends, the rod being non-rotatable with respect to the plate, g. resilient means disposed between the units to permit them to move relatively, and at least one adjustable length tie rod extending between the end supports for securing the units together, h. the construction and arrangement being such that by relative orientation of the supports the rod may be shaped to a desired curve between its ends, the run portions moving relative to each other and forming curved guideways corresponding to the curvature of the rod.

11. A conveyor in accordance with claim 10 wherein the resilient means comprises two sets of compression springs disposed between the plates at opposite sides of the central apertures, and an adjustable length tie rod for each set.

* * * * *